June 18, 1963
R. K. POTTLE
3,094,026
CUTTER SPACING DEVICE
Filed June 10, 1960
2 Sheets-Sheet 1
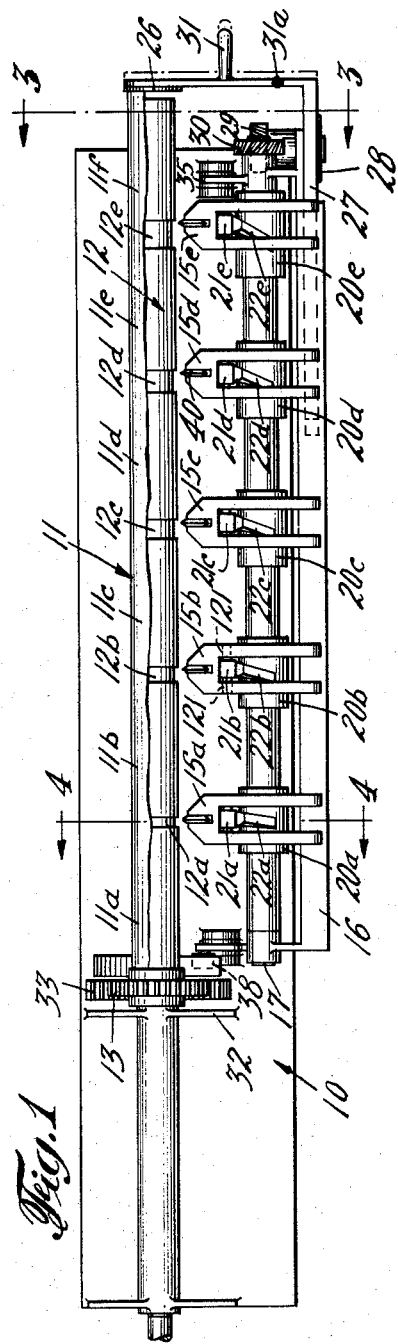
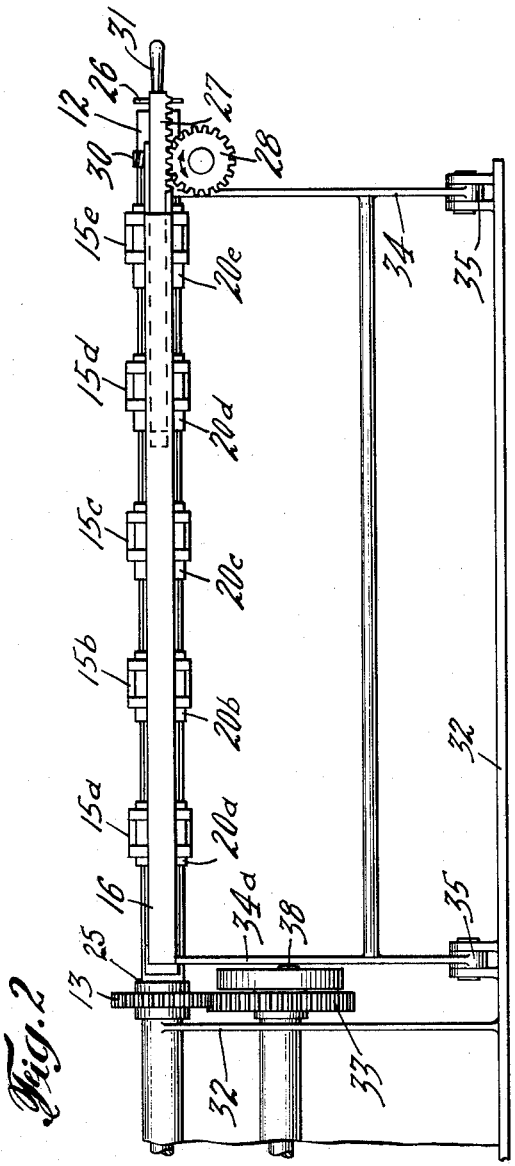
INVENTOR.
RALPH KENNICOTT POTTLE
BY Clyde H. Hayner
George W. Reiber
ATTORNEYS June 18, 1963  R. K. POTTLE  3,094,026
CUTTER SPACING DEVICE
Filed June 10, 1960  2 Sheets-Sheet 2
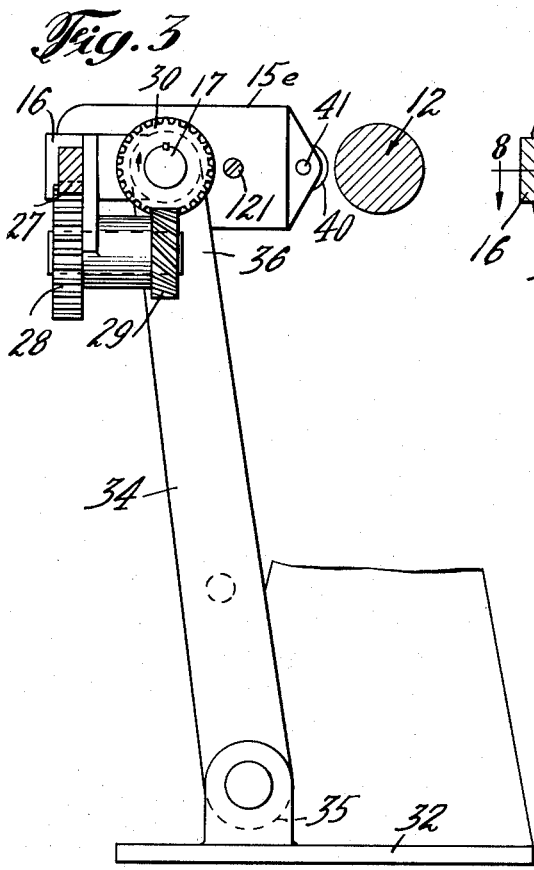
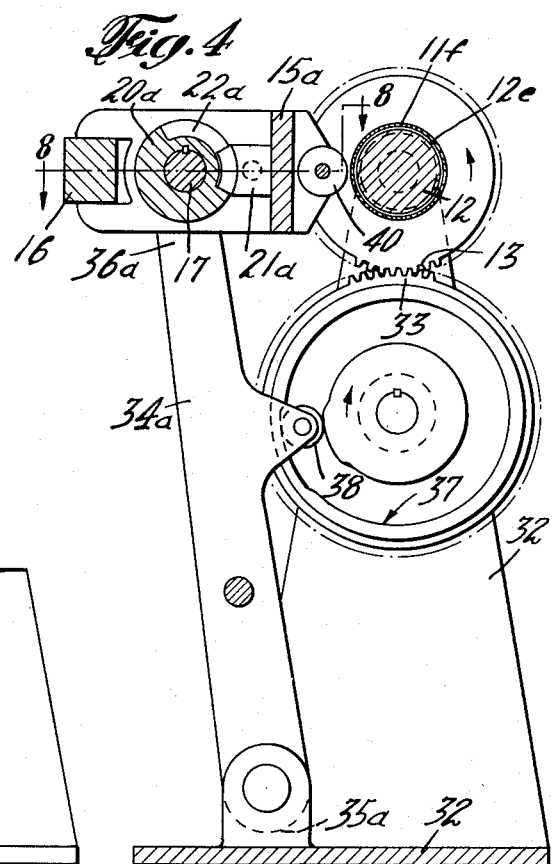
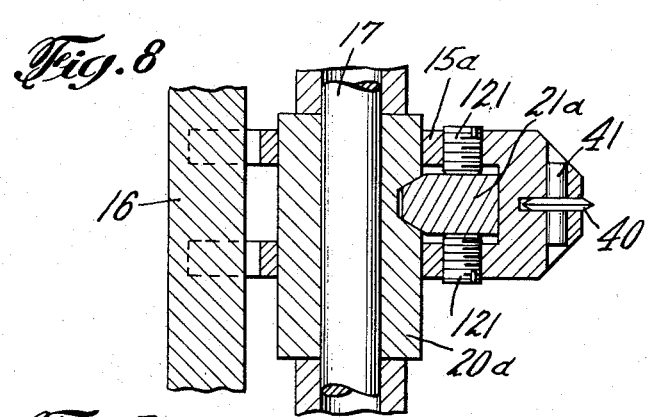
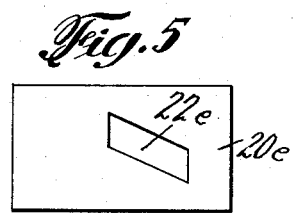
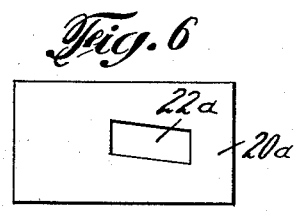
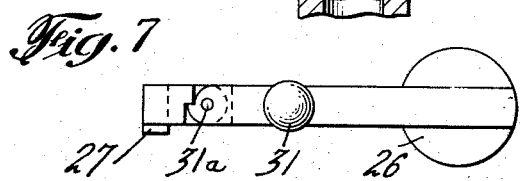
INVENTOR.
RALPH KENNICOTT POTTLE
BY
ATTORNEYS

Patent 3,094,026 — Cutter Spacing Device

3,094,026
CUTTER SPACING DEVICE
Ralph Kennicott Pottle, Georgetown, Conn., assignor to American Can Company, New York, N.Y., a corporation of New Jersey
Filed June 10, 1960, Ser. No. 35,288
8 Claims. (Cl. 82—46)

This invention relates to machines for cutting tubing into a plurality of portions of uniform length in a given cutting operation, and has particular reference to such a mechanism wherein means are provided to uniformly vary the spacing between the cutting elements so that the length of such cut portions may be varied from one cutting operation to the next. The present invention is particularly adapted for cutting workpieces in the form of helically wound tubes of unequal lengths into workpiece portions in the form of tubular container bodies of uniform length, but is equally adapted for cutting individual container bodies from endless tubing as an incident to the tube winding and forming operation.

Many container bodies are manufactured by helically winding a strip into a tubular workpiece. The outer surface of the strip carries the decoration for the container. This decoration is positioned repetitively along the strip. The helically wound strip is cut between adjacent decorations after it is formed into a workpiece to cut the workpiece into a plurality of individual container bodies with each having its decoration. Usually these workpieces have dissimilar lengths or dimensions, especially if the strip is a fibrous material or a stretchable material, for example, paper or cardboard or rubber-like resilient materials.

The lengths of fibrous workpieces of the tubular type have been found to vary as much as two percent, and thus an amount sufficient to destroy desired positioning of decoration on a finished container body. For this reason it has been found necessary to divide the workpieces of dissimilar dimensions into workpiece portions or individual container bodies of equal dimension. When the workpiece is divided into workpiece portions of equal dimensions any error in the total lengths of the workpiece will be divided equally among the individual workpiece portions, or individual container bodies. As a result and by dividing the error among all of the workpiece portions, or individual container bodies, the decoration for each individual container, which decoration was on the strip prior to the winding of the container is more uniformly centered on its respective container body. In addition, the chances of having a portion of the decoration for one container appear on two different containers is considerably eliminated.

One of the objects of the present invention is to overcome the aforementioned problems.

A further object of the invention is to provide a tool for cutting any one of a plurality of workpieces of dissimilar dimensions into a plurality of workpiece portions of equal dimension.

Numerous other objects and advantages of the invention will be apparent as it is better understood from the following description, which, taken in connection with the accompanying drawings, discloses a preferred embodiment thereof.

FIGURE 1 is a top view of the tube cutting machine;
FIG. 2 is a front elevational view of the tube cutting machine;
FIG. 3 is an enlarged sectional view taken along the line 3—3 of FIG. 1;
FIG. 4 is an enlarged sectional view taken along the line 4—4 of FIG. 1;
FIG. 5 is the layout of the cam for positioning one of the cutters;
FIG. 6 is the layout of the cam for positioning another of the cutters;
FIG. 7 is an enlarged view of the handle; and
FIG. 8 is a sectional view along the line 8—8 of FIG. 4.

The following description, when taken along with the remainder of the specification, including the appended claims, and the above described drawings set forth the invention and a specific embodiment of a machine for carrying out the invention or the improvement described, illustrated and claimed herein. The specific embodiment illustrated herein includes a machine 10 which is designed for cutting any one of a plurality of workpieces of dissimilar dimensions, for example, tube 11 into a plurality of workpiece portions, for example, individual tubular container bodies 11a, 11b, 11c, 11d, 11e, and 11f. Upon completion of the cutting of the tube 11 into the individual container bodies 11a to 11f inclusive, each of these individual container bodies or workpiece portions, 11a to 11f inclusive, will have an equal length or equal dimension. The machine 10 has a rotatable mandrel 12 rotated by suitable drive gear 13 for holding and rotating tube 11 during the cutting operation. Tube 11 is cut by a plurality of cutters 15a, 15b, 15c, 15d, and 15e, which are slidable along a slide bar 16 and a cam shaft 17 extending parallel thereto and parallel to holder 12. Cam shaft 17 is journaled on machine 10 for rotary movement in either direction around the axis of the cam shaft and against movement in either direction axially of the cam shaft. The cutters are slidable along the slide bar 16 from respective initial positions, to the right of their positions shown in FIG. 1. From these initial positions the cutters are movable to the left to other positions, but at all times the cutters are equally spaced apart and are positioned to divide a workpiece or tube 11 into a plurality of workpiece portions or individual container bodies of more than one length, as shown in FIG. 1 and in which the cutters are still equally spaced apart but by a lesser distance than when in their initial positions, preparatory to severing tube 11 into the plurality of container bodies 11a, 11b, 11c, 11d, 11e, and 11f of equal length.

As further illustrated in the drawings, the cutters 15a to 15e are operatively associated with spaced cams 20a, 20b, 20c, 20d, 20e, respectively. In this instance barrel type cams are used. All of the cams 20a to 20e are spaced apart along and are secured to cam shaft 17 for simultaneous rotation therewith so that each cutter will be positioned along mandrel 12 and slide bar 16 by its respective cam. Operative association of the cutters 15a to 15e and the respective cams 20a to 20e is obtained by providing the cutters and cams with cam followers 21a to 21e and engaged cam surfaces 22a to 22e respectively. In this instance the cam surfaces are on the respective cams and the followers are on the respective cutters. Also, if desired each cam follower may be adjustably mounted relative to the respective cutter to micrometrically adjustably position that respective cutter along and relative to the cams and cam shaft. The adjustment may be had by engaging the cam follower of the respective cutter with an adjusting screw, for example, screw 121, threadably carried by the body of the respective cutter. Each cam surface differs in lead or pitch from each other cam surface and all of the cam surfaces are cooperative simultaneously to move each cutter along the slide bar 16 and relative to its next adjacent cutter a distance proportional to the distance of the cutter from the stationary stop 25 to move the cutters from their initial positions to the cutting positions, illustrated in FIG. 1.

As previously described, the cutting positions of the respective cutters are determined in accordance with the length of the particular tube 11 placed on mandrel 12, so that the tube may be severed into individual container bodies 11a to 11f of equal length.

The holding means for retaining the tube in position includes a longitudinally stationary stop 25 at one end of mandrel 12 to abut one end of tube 11 and a longitudinally movable stop 26 at the other end of mandrel 12 to abut the opposite end of tube 11 while it is on the mandrel or holder 12. Thus, stop 26 is movable towards and away from stationary stop 25 so that the opposite ends of tube 11 are abutted by stops 25 and 26 respectively when tube 11 is in position to be cut. Longitudinal movement of stop 26 against the end of tube 11 next adjacent thereto or towards and away from stop 25 is transposed to rotary movement of cam shaft 17 and the cams 22a to 22e keyed thereto. This transposition is effected by means of a rack 27 and a gear train including gears 28, 29, and 30, the latter being keyed to cam shaft 17. As illustrated rack 27 is slidably mounted in slide bar 16 for slidable movement lengthwise thereof upon movement of stop 26. The gears 28 and 29 are journaled on machine 10 and are secured to each other for simultaneous rotary movement to transfer the movement from rack 27 to gear 30.

If desired stop 26 may be provided with a handle 31 and a hinge 31a to permit manual movement of stop 26 and rack 27 to permit movement of stop 26 transverse to mandrel 12.

As further indicated in the drawings, and particularly FIGURES 3 and 4, mandrel 12 is journaled in a standard 32 which supports a drive gear 33 enmeshed with gear 13. Slide bar 16 and cam shaft 17 are supported between spaced legs 34 and 34a which are pivoted at their lower ends 35 and 35a to standard 32. Slide bar 16 and cam shaft 17 are mounted on the upper ends 36 and 36a of legs 34 and 34a respectively so that pivoted movement of legs 34 and 34a relative to standard 32 and about ends 35 and 35a will move cutters 15a to 15e towards and away from mandrel 12. As is best illustrated in FIG. 4 the movement of cutters 15a to 15e towards and away from mandrel 12, and transverse to the axis of rotation of mandrel 12, is obtained by providing drive gear 33 with a cam track 37 and providing leg 34a with a cam follower roll 38 which rides in track 37. It is noted that drive gear 33 has a larger diameter or circumference than gear 13 to insure at least a complete revolution of mandrel 12 and any tube 11 carried thereby every time gear 33 makes a complete revolution so that the tube 11 will but cut by each of the cutters throughout its circumference. Mandrel 12 is provided with grooves 12a, 12b, 12c 12d, 12e, positioned to receive their respective cutters 15a to 15e.

If desired and as illustrated, the tube severing elements of each of the cutters 15a to 15e may be a rotary knife 40 mounted on a pin 41 as shown in FIG. 3.

When tube 11 is to be cut and divided into the individual container bodies, 11a, 11b, 11c, 11d, 11e, and 11f, an operator swings stop 26 out of alignment with mandrel 12 by means of handle 31 and slides the tube 11 onto mandrel 12. Thereafter the operator swings stop 26 back to alignment with the mandrel, abuts it against the end of tube 11 and moves stop 26 towards stop 25 until stops 25 and 26 abut the opposite ends of tube 11. Movement of stop 26 to the left in FIG. 1 until container 11 is abutted tightly against stops 25 and 26 simultaneously moves rack 27 to the left in FIG. 1 to move the cutters from their initial position to their cutting position. In this instance and because stop 25 is at an axially stationary position at all times, cutter 15a will be moved for a shorter distance towards stop 25 than any of the other cutters. Each succeeding one of the cutters 15a, 15b, 15c, 15d, and 15e, in that order, will be moved a longer distance towards stop 25 than the next closer cutter. Each of the cam surfaces 22a, 22b, 22c, 22d, and 22e is arranged so that the total distance between stops 25 and 26 is always divided into equal portions with the cutters 15a to 15e positioned between those equal portions. After container 11 is placed between stops 25 and 26, and the cutters are positioned in their cutting positions, drive gear 33 is rotated to force the cutters, by means of cam track 37 and cam follower wheel 38, through the wall of tube 11 and into the grooves 12a, 12b, 12c, 12d, and 12e, and simultaneously to rotate mandrel 12 and the tube 11 frictionally fitted thereon. When drive gear 33 makes a complete revolution, track 37 cooperates with cam follower wheel 38 to move the cutters away from mandrel 12 so that the container bodies 11a, 11b, 11c, 11d, and 11e may be removed from mandrel 12 in preparation for cutting another tube 11.

Although the drawings show the adjustable cutting mechanism of the instant invention as applied to a machine for sub-dividing individual lengths of tubing into portions of uniform length, it will be obvious that its uses are not so limited and that such mechanism can be utilized in various other applications. One such application is the utilization of the mechanism as a gang cutter in a spiral winding machine to cut the endless prelabelled tubing into individual container bodies, each of which contains a full label pattern, as such tubing comes off the winding mandrel. In such application, the cutting knives and the means for uniformly varying the spacing between them are mounted for reciprocation alongside the winding mandrel in the manner disclosed in E. B. Robinson Patents Re. 23,899, 2,623,443 and 2,737,091, and a running adjustment is made to maintain the knives in correspondence with the lengths of the prelabeled bodies, either automatically by suitable electric eye controls in the manner well known in the art, or by manual adjustment by the machine operator.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. A machine for cutting cylindrical articles into a plurality of lengths, comprising holding means for retaining a said article in a predetermined position, a plurality of axially spaced cutters mounted alongside said held article for movement axially of said article and also toward and from the axis of said article, said holding means including an axially stationary stop and an axially movable stop for abutting the opposite ends of said article, means connected with said movable stop and also with said cutters for moving each of said cutters axially with said movable stop a distance substantially proportional to the axial distance of the cutter from stationary stop, whereby movement of said movable stop into article holding position automatically moves said cutters different distances to space them apart predetermined distances along the length of said article, and means for moving said cutters toward said axis to sever the article into a plurality of lengths.

2. A machine for cutting cylindrical articles into a plurality of equal lengths, comprising holding means for retaining a said article in a predetermined position for rotation on its axis, a plurality of cutters mounted alongside said held article at substantially equal distances apart for movement axially of said article and also toward and from said axis, said holding means including an axially stationary stop and an axially movable stop for abutting the opposite ends of said article, means connected with said movable stop and also with said cutters for moving each of said cutters axially with said movable stop a distance substantially proportional to the axial distance of the cutter from said stationary stop, whereby movement of said movable stop into article holding position automatically moves said cutters different distances to space them equal distances apart along the length of said article, means for rotating said held article on its axis, and means for moving said cutters toward said axis to sever the rotating article into a plurality of equal lengths.

3. The machine of claim 2 wherein said cutting members comprise circular knives.

4. The machine of claim 3 wherein said article is a tube and said holding means comprises an internal mandrel on which said tube is supported.

5. The machine of claim 4 wherein said internal mandrel is recessed inwardly of said cutting knives within the range of operation of said cutting knives.

6. The machine of claim 2 wherein said means for varying the spacing between said cutters comprises a plurality of cams, one of which is associated with each cutter.

7. The machine of claim 6 wherein said cams are barrel cams and are secured to and rotated by a single cam shaft.

8. The machine of claim 7 wherein said barrel cams have helical cam grooves, and wherein the pitch angles of the cam grooves of successive cams are successively increased by a uniform number of degrees.

References Cited in the file of this patent

UNITED STATES PATENTS

| | | |
|---|---|---|
| 194,108 | Poetz | Aug. 14, 1877 |
| 665,358 | Adams | Jan. 1, 1901 |
| 712,435 | Livingstone | Oct. 28, 1902 |
| 1,753,827 | Glasser et al. | Apr. 8, 1930 |
| 1,967,374 | Scott | July 24, 1934 |
| 2,696,253 | Hartman | Dec. 7, 1954 |

FOREIGN PATENTS

| | | |
|---|---|---|
| 282 | Sweden | Apr. 16, 1886 |
| 604,657 | Germany | Oct. 25, 1934 |